United States Patent Office 3,207,993
Patented Sept. 21, 1965

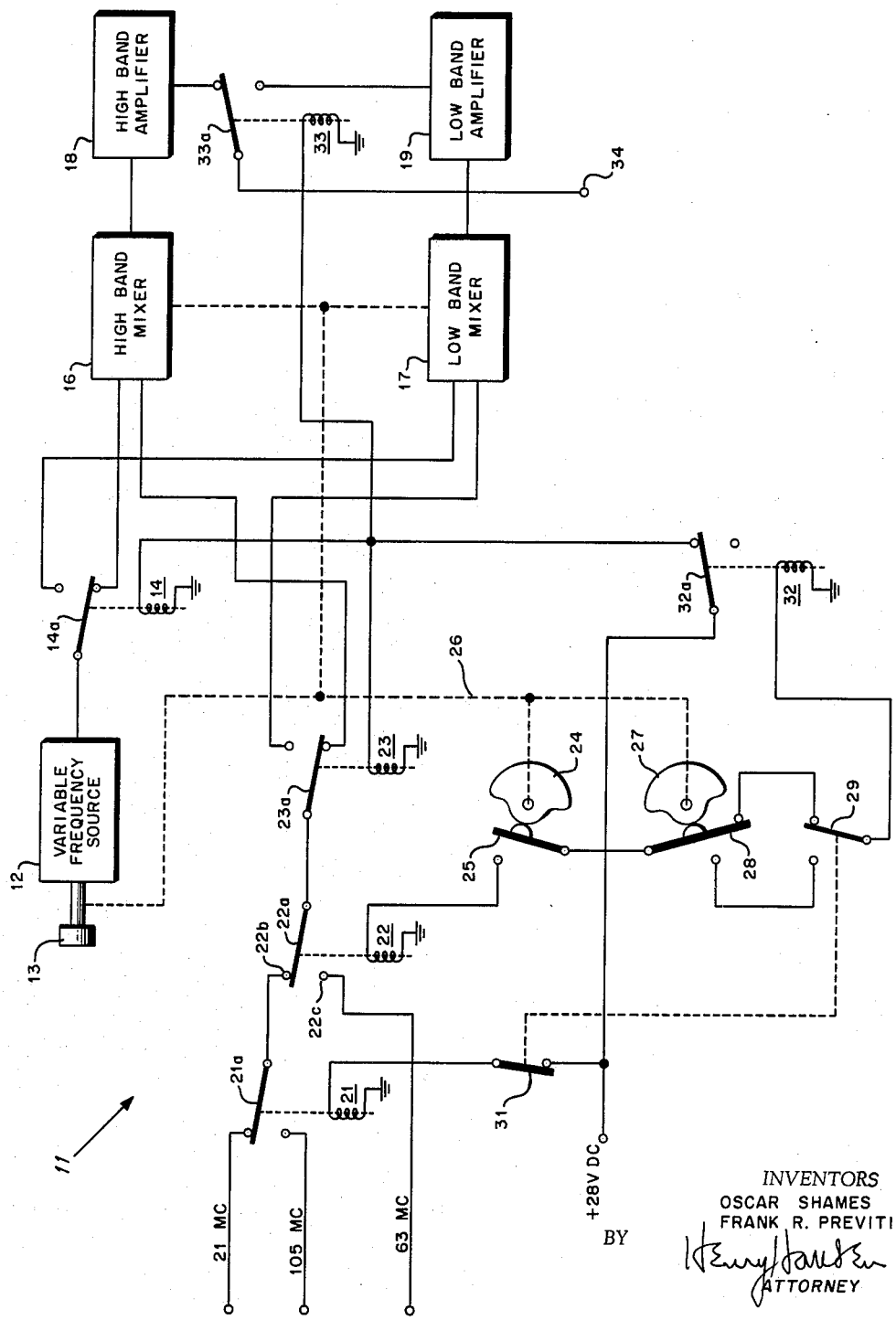

3,207,993
FREQUENCY SYNTHESIZER EMPLOYING PLURAL INPUT SOURCES AND PLURAL SWITCHING- MEANS PRODUCING WIDE RANGE OF OUTPUT FREQUENCIES
Frank R. Previti and Oscar Shames, Philadelphia, Pa., assignors to the United States of America as represented by the Secretary of the Navy
Filed July 30, 1963, Ser. No. 298,797
9 Claims. (Cl. 328—14)
(Granted under Title 35, U.S. Code (1952), sec. 266)

The invention described herein may be manufactured and used by or for the Government of the United States of America for governmental purposes without the payment of royalties thereon or therefor.

This invention relates to a frequency synthesizer, and more particularly to a frequency synthesizer for simulating frequencies used in a TACAN air-to-air ranging system.

A basic TACAN system comprises an airborne transmitter receiver and a ground beacon or equivalent. To obtain range information with respect to selected ground beacon, the airborne equipment interrogates the selected ground beacon with 12 microsecond spaced pulse pairs on any of 126 channels spaced 1 magacycle apart between 1025 megacycles and 1150 megacycles. The ground beacon transponds with 12 microsecond spaced pulse pairs on any of 126 corresponding channels spaced 1 megacycle apart between 962 megacycles and and 1024 megacycles on a low band and between 1151 megacycles and 1213 megacycles on a high band. In the TACAN system range information is obtained utilizing circuitry in the airborne equipment which functions to measure the time period which elapses between transmission of an interrogating pulse pair and receipts of a reply pulse pair. Azimuth information is conveyed by amplitude modulating reply pulse pairs, random pulse pairs and reference pulse pairs.

After development of the above air-to-ground TACAN navigation system, it became apparent that in many instances air-to-air TACAN ranging in which all TACAN equipment was air-borne, was highly desirable. Therefore the original air-to-ground TACAN navigation system was modified to provide an air-to-air ranging capability. This air-to-air TACAN ranging system forms the subject matter of a patent entitled "Air-to-Air Ranging system" by O. Shames et al., 3,076,190 issued January 29, 1963 of which one of the inventors is a co-inventor of the present invention.

As with all highly complex navigation systems, important complementary equipment associated therewith is test equipment. Thus, simultaneous with the development of the air-to-ground TACAN navigation system there was developed a radio test set AN/ARM-22 designed to produce simulated TACAN surface-beacon signals.

With the development of the air-to-air TACAN ranging systems utilizing airborne TACAN sets in an additional mode function the distance from one aircraft to as many as five other craft may be indicated at each aircraft. In the air-to-air mode, the airborne TACAN sets transmit signals from 1025 megacycles to 1150 megacycles as in normal TACAN. However, the air-to-air TACAN also receives 1025 megacycles to 1150 megacycles.

The present test set AN/ARM-22 for use with the air-to-ground TACAN navigation system does not have the capability of generating the air-to-air TACAN radio frequencies, that is, the 126 channels between 1025 megacycles and 1150 megacycles. The present invention contemplates a frequency synthesizer for producing the required radio frequencies to simulate the radio frequencies used by the air-to-air TACAN ranging system.

The present invention contemplates a modification of the test set AN/ARM-22 which is the TACAN simulator used in testing the air-to-ground TACAN navigation system providing this test set with another mode of operation and enabling it to generate all the frequencies used by the air-to-air TACAN ranging systems. Such a modification provides the test set AN/ARM-22 with a greatly increased utility enabling its use with both the air-to-ground TACAN navigation system and the newer air-to-air TACAN ranging system.

Therefore, it is an object of the present invention to provide a frequency synthesizer for generating radio frequencies simulative of the frequencies used in an air-to-air TACAN ranging system.

Another object of the present invention is to provide an existing frequency synthesizer with an alternate mode of operation and to provide it with the capability of generating all of the radio frequencies used in air-to-air TACAN ranging systems.

A further object of the present invention is to provide a frequency synthesizer or TACAN simulator with an alternate mode of operation whereby it is provided with the capability of producing a new range of frequencies which greatly increases the utility of the frequency synthesizer.

With these and other objects in view, as will hereinafter more fully appear and which will be more particularly pointed out in the appended claims, reference is now made to the following description taken in connection with the accompanying drawing in which:

The figure illustrates partly in block diagram form and partly in schematic form a preferred embodiment of the invention;

Referring now to the figure, there is shown the improved frequency synthesizer 11 of the present invention. As shown, frequency synthesizer 11 has the capability of generating 252 discrete frequencies 1 megacycle apart. Frequency synthesizer 11 comprises a variable frequency source 12 which is capable of providing as an output 42 separate frequencies ranging from 1067 megacycles to 1108 megacycles. Variable frequency source 12 comprises a 42 crystal oscillator wherein the crystals may be selected in sequence by means of manual rotor 13 to thereby provide as an output on switch arm 14a of relay of relay 14 any one of the 42 frequencies spaced one megacycle apart and included in the range of 1067 megacycles to 1108 megacycles. Rotor 13 has 42 separate positions (each corresponding to one of the 42 frequencies 1067 to 1108 magacycles). As rotor 13 is turned through one revolution, the 42 frequencies appear in sequence at the output of variable frequency source 12 and for each full rotation of rotor 13 thereafter the same frequencies reappear in sequence. Rotor 13 may be thought of as a selector knob and may be appropriately calibrated.

With switch arm 14a in the position shown, the output of variable frequency source 12 provides an input to high band mixer 16. When switch arm 14a is in the position opposite from that shown, the output from variable frequency source 12 is provided as an input to low band mixer 17. The outputs of high band mixer 16 and low band mixer 17 are amplified in high band amplifier 18 and low band amplifier 19, respectively.

Depending on the mode of operation, that is, normal mode or the air-to-air mode, frequency synthesizer 11 will always be provided with a second input of 21, 105, and 63 megacycles, as indicated on the drawing. These frequencies may be supplied in any desirable manner such as an oscillator and multiplier arrangement, or three separate oscillators individually providing the frequencies.

Arm 21a of relay 21 serves to connect the 21 megacycle source or the 105 megacycle source to terminal 22b of relay 22 dependent on its state of energization. Relay 21 is energized throughout the air-to-air mode of operation of frequency synthesizer 11 and when relay 21 is energized, it is the 21 megacycle source which is connected to terminal 22b through arm 21a. During the normal mode of operation it is the 105 megacycle source which is connected to terminal 22b since relay 21 is then energized and arm 21a is in the position opposite from that shown. The 63 megacycle source is connected directly to terminal 22c. The position of arm 22a of relay 22 connects terminal 22b or 22c to arm 23a of relay 23 in accordance with the position of rotor 13 to be more fully explained hereinbelow.

Relay 23 which is energized in a manner to be discussed more fully hereinbelow, connects terminal 22b or 22c of relay 22 to high band mixer 16 or low band mixer 17 in accordance with the energized condition of relay 23. In the position shown relay arm 23a connects terminal 22b to high band mixer 16.

Cam 24 controls operation of switch 25. Cam 24 is connected to rotor 13 via the mechanical linkage represented by dotted line 26. As variable frequency source 12 is cycled through its 42 frequencies by rotor 13 the first time, switch 25 is in the position shown. On the second cycle of variable frequency source 12, however, cam 24 is rotated to a position which closes switch 25 throughout the second recycling of variable frequency source 12 thereby energizing relay 22 from the 28 volt source. This energizes relay 22 to cause arm 22a to take up a position opposite from that shown and connect terminal 22c to switch arm 23a.

Similarly, cam 27 controls operation of switch 28. Throughout the first one and one-half cycles of variable frequency source 12, switch arm 28 is in the position shown. Throughout the second one and one-half cycles of variable frequency source 12, switch 28 takes up a position opposite from that shown. The configuration of cams 24 and 27 which provides the function discussed above is a matter of design and other means could be utilized to provide the same function, e.g., switches 25 and 28 might be operated electrically.

Switch 29 which is mechanically linked to switch 31, is manually operated and in the position shown causes frequency synthesizer 11 to be in the air-to-air mode of operation. Dependent on the position of switch 28, a 28 volt source of D.C. will be connected to energize the coil of relay 32. Relay 32 is only energized when switches 28 and 29 are both in the position shown or both are in the position opposite that shown. Relay 32 controls the energization of relays 14, 23 and 33 by actuation of arm 32a for the connection of the 28 volt source of D.C. to each of relays 14, 23 and 33. Relay 33 controls actuation of arm 33a to connect the output of high band amplifier 18 or the output of low band amplifier 19 to output terminal 34 dependent on the position of arm 33a.

In the normal mode of operation, that is, with switches 29 and 31 in the position opposite from that shown, relay 21 will be unenergized and the 105 megacycle source will be connected to the terminal 22b. As rotor 13 is rotated through one and one-half rotations, relays 32, 23, 14, and 33 are unenergized and all switch arms are in the position opposite from that shown. For the first complete rotation of rotor 13, that is, the first 42 discrete frequencies produced at the output of variable frequency source 12, relay 22 also will be unenergized since cam 24 is so configured to maintain switch 25 open for one complete rotation of rotor 13 and then to maintain switch 25 closed for the second complete rotation of rotor 13. For this case, the 42 frequencies, that is, the frequencies of 1067 megacycles to 1108 megacycles are mixed (each one in turn) with the 105 megacycle frequency in low band mixer 17 to provide at output terminal 34 each one of the frequencies 962 to 1003 megacycles from low band amplifier 19.

The next complete revolution of rotor 13 causes variable frequency source 12 to recycle and repeat the 42 discrete frequencies at its output. However, during this cycle of variable frequency source 12 relay 22 is energized because cam 24 then causes switch 25 to connect the 28 volt source of D.C. to relay 22 causing arm 22 to make contact with terminal 22c. This provides the 63 megacycle source as an input to low band mixer 17 where it is subtracted from the selected frequency input from variable frequency source 12 and each of the frequencies provided in sequence by variable frequency source 12 when rotor 13 is rotated.

After variable frequency source 12 has completed the first half of its second cycle by rotation of rotor 13, cam 27 causes switch 28 to assume the position opposite from that shown. Since frequency synthesizer 11 is in its normal mode of operation, switch 29 is in the position opposite from that shown and relay 32 is energized to cause arm 32a to take up the position as shown. This energizes relays 14 and 23 and causes arms 14a and 23a to take up the positions shown. Relay 33 is energized from the same source and causes switch arm 33a to take up the position shown. The effect of this switching is to switch the output from variable frequency source to high band mixer 16 as well as to switch the appropriate frequency source 21, 105, 63 megacycles to high band mixer 16. During the second half of the second recycling of variable frequency source 12 as caused by rotation of rotor 13, it is the 63 megacycle source which is connected to the high band mixer 16. The 63 megacycle frequency is added to the output of variable frequency source 12 in high band mixer 16 and after amplification in high band amplifier 18, the sum of the frequencies fed to high band mixer 16 is provided as an output at output terminal 34.

During the third revolution of rotor 13 (the third recycling of variable frequency source 12), switch 25 is again opened due to the action of cam 24 and relay 22 is deenergized thereby connecting the 105 megacycle source to high band mixer 16 where it is added to each of the outputs from variable frequency source 12 in sequence. This summation of frequencies is provided as an output at output terminal 34.

Thus, by recycling rotor 13 through three rotations it is possible to provide a range of discrete frequencies at output terminal 34—the first half of which range from 962 megacycles to 1024 megacycles and the second half of which range from 1151 megacycles to 1213 megacycles. Since the variable frequency source provides 42 discrete frequencies depending on the position of rotor 13, the output at output terminal 34 will be a range of discrete frequencies which are separated from one another by one megacycle. Obviously, rotor 13 can be stopped at any desired position to maintain the output of variable frequency source 12 at any one of the 42 frequencies provided thereby which enables frequency synthesizer 11 to produce at output terminal 34 any one of 126 discrete frequencies included in the range 962 to 1024 megacycles and 1151 to 1213 megacycles.

When frequency synthesizer 11 is switched to the air-to-air mode of operation, that is, when switches 29 and 31 are switched to the position shown, the output frequency at output terminal 34 dependent on the position of rotor 13 is one of 126 discrete frequencies spaced one megacycle apart. In this mode of operation, the output frequencies provided at output terminal 34 are included in the range of 1025 to 1151 megacycles.

Operation of frequency synthesizer 11 in the air-to-air mode is similar to its operation in the normal mode except that all switching is reversed. For example, switch arms 29 and 31 are now in the position shown and relay 21 is energized to provide or connect the 21 megacycle source to terminal 22b. Throughout the first rotation of rotor 13 which varies frequency source 12 through its 42 discrete frequencies, switch 25 remains open. Throughout the first full rotation of rotor 13 and also through the first half of the second rotation of rotor 13 switch 28 is in the position shown. Thus, it is the 21 megacycle source which is connected to high band mixer 16 throughout the first rotation of rotor 13 and it is the 63 megacycle source which is connected to high band mixer 16 throughout the first half of the second rotation of rotor 13. During the second half of the second rotation of rotor 13 and during the third full rotation of rotor 13, cam 27 causes switch 28 to take up the position opposite from that shown thereby deenergizing relay 32 which in turn deenergizes relays 14, 23 and 33. This switches operation from the high band mixer 16 to low band mixer 17 where it is the 63 megacycle source which is subtracted from the output of variable frequency source 12 during the second half of the second rotation of rotor 13. During the third revolution of rotor 13, switch 25 is again closed and it is the 21 megacycles source which is subtracted from the selected output from variable frequency source 12 in low band mixer 17.

Thus, frequency synthesizer 11 during the normal mode of operation provides one of 126 discrete frequencies at output terminal 34 depending on the position and particular rotative cycle of rotor 13. These frequencies are one megacycle apart and may be varied from 962 to 1024 and 1151 to 1213 megacycles. By an unique switching arrangement, the total number of discrete frequencies available at output terminal 34 may be doubled. The additional frequencies thus made available are the ones required for simulating the air-to-air TACAN ranging system frequencies. Thus, in the air-to-air mode, frequency synthesizer 11 provides 126 discrete frequencies at output terminal 34 which are one megacycle apart and which vary from 1025 through 1151 megacycles.

Rotor 13 is shown as also mechanically linked to high band mixer 16 and low band mixer 17. As rotor 13 is rotated throughout three complete rotations, each of mixers 16 and 17 are appropriately tuned in accordance with the position of rotor 13 by means of the mechanical connection to provide for more efficient additive and subtractive functions of the mixers.

Obviously, many modifications and variations of the present invention are possible in the light of the above teachings. It is therefore to be understood that within the scope of the appended claims the invention may be practiced otherwise than as specifically described.

What is claimed is:

1. A frequency synthesizer, comprising in combination:
   first mixer means,
   second mixer means,
   first frequency source means,
   means connected to said first frequency source means for cycling said first frequency source means through a predetermined range of discrete frequencies,
   second frequency source means provided first, second and third frequencies as outputs,
   first terminal switch means connected to said second frequency source providing said first or second frequencies as an output,
   second terminal switch means connected to said second frequency source providing said third frequency as an output,
   first switch means selectively connecting said first or second terminal switch means and said first frequency source means to said first mixer means throughout the first cycle and a half of said first frequency source means and to said second mixer means throughout the second cycle and a half of said first frequency source means,
   second switch means included in said second frequency source means for selectively connecting said first or second frequencies to said first terminal switch means.

2. A frequency synthesizer, comprising in combination:
   first mixer means,
   second mixer means,
   first frequency source means,
   means connected to said first frequency source means for cycling said first frequency source means through a predetermined range of discrete frequencies,
   second frequency source means providing first, second and third frequencies as outputs,
   first terminal switch means connected to said second frequency source providing said first or second frequencies as an output,
   second terminal switch means connected to said second frequency source providing said third frequency as an output,
   first switch means selectively connecting said first or second terminal switch means and said first frequency source means to said first mixer means throughout the first cycle and a half of said first frequency source means and to said second mixer means throughout the second cycle and a half of said first frequency source means,
   automatic switch means alternately connecting said first or second terminal switch means to said first switch means after each cycle of said first frequency source means,
   second switch means included in said second frequency source means for selectively connecting said first or second frequencies to said first terminal switch means.

3. A frequency synthesizer, comprising in combination:
   first mixer means,
   second mixer means,
   first frequency source means,
   rotor means connected to said first frequency source means for selectively varying said first frequency source means through a cycle of discrete frequencies,
   second frequency source means,
   relay means connected to said rotor means automatically connecting said first and second frequency source means to said first mixer means throughout the first cycle and a half of said first frequency source means and to said second mixer means throughout the second cycle and a half of said first frequency source means,
   switch means included in said relay means for reversing operation of said relay means whereby said first and second frequency source means is connected to said second mixer means throughout the first cycle and a half of said first frequency source means and to said first mixer means throughout the second cycle and a half of said first frequency source means.

4. A frequency synthesizer, comprising in combination:
   first mixer means,
   second mixer means,
   first frequency source means,
   means connected to said first frequency source means for cycling said first frequency source means through a predetermined range of discrete frequencies,
   second frequency source means providing first, second and third frequencies as outputs,
   first terminal switch means connected to said second frequency source providing said first or second frequencies as an output,
   second terminal switch means connected to said second frequency source providing said third frequency as an output,
   first switch means selectively connecting said first or second terminal switch means and said first frequency source means to said first mixer means throughout the first cycle and a half of said first frequency source means and to said second mixer means throughout the second cycle and a half of said first frequency source means, means connected to said first switch means for reversing polarity of said first switch means to cause said first or second terminal switch means and said first frequency source means to be connected to said second mixer means throughout the first cycle and a half of said first frequency source means and to said first mixer means throughout the second cycle and a half of said first frequency source means, second switch means included in said second frequency source means for selectively connecting said first or second frequencies to said first terminal switch means.

5. A frequency synthesizer, comprising in combination:
first mixer means,
second mixer means,
first frequency source means,
means connected to said first frequency source means for cycling said first frequency source means through a predetermined range of discrete frequencies,
second frequency source means providing first, second and third frequencies as outputs,
first terminal switch means connected to said second frequency source providing said first or second frequencies as an output,
first terminal switch means connected to said second frequency source providing said third frequency as an output,
first switch means selectively connecting said first or second terminal switch means and said first frequency source means to said first mixer means throughout the first cycle and a half of said first frequency source means and to said second mixer means throughout the second cycle and a half of said first frequency source means,
means connected to said first switch means for reversing polarity of said first switch means to cause said first or second terminal means and said first frequency source means to be connected to said second mixer means throughout the first cycle and a half of said first frequency source means and to said first mixer means throughout the second cycle and a half of said first frequency source means,
automatic switch means alternately connecting said first or second terminal switch means to said first switch means after each cycle of said first frequency source means,
second switch means included in said second frequency source means for selectively connecting said first or second frequencies to said first terminal switch means.

6. A frequency synthesizer, comprising in combination:
first mixer means,
second mixer means,
first frequency source means,
means connected to said first frequency source means for cycling said first frequency source means through a predetermined range of discrete frequencies,
second frequency source means providing first, second and third frequencies as outputs,
first terminal switch means connected to said second frequency source providing said first or second frequencies as an output, manually operated switch means for selectively connecting said first or second frequencies from said second frequency source to said first terminal switch means,
second terminal switch means connected to said second frequency source providing said third frequency as an output,
first switch means selectively connecting said first or second terminal switch means and said first frequency source means to said first mixer means throughout the first cycle and a half of said first frequency source means and to said second mixer means throughout the second cycle and a half of said first frequency source means, second switch means included in said second frequency source means for selectively connecting said first or second frequencies to said first terminal switch means.

7. A frequency synthesizer, comprising in combination:
first mixer means,
second mixer means,
first frequency source means,
means connected to said first frequency source means for cycling said first frequency means through a predetermined range of discrete frequencies,
second frequency source means providing first, second and third frequencies as outputs,
first terminal switch means connected to said second frequency source providing said first or second frequencies as an output,
manually operated switch means for selectively connecting said first or second frequencies from said second frequency source to said first terminal switch means,
second terminal switch means connected to said second frequency source providing said third frequency as an output,
first switch means selectively connecting said first or second terminal switch means and said first frequency source means to said first mixer means throughout the first cycle and a half of said first frequency source means and to said second mixer means throughout the second cycle and a half of said first frequency source means,
automatic switch means alternately connecting said first or second terminal switch means to said first switch means after each cycle of said first frequency source means,
second switch means included in said second frequency source means for selectively connecting said first or second frequencies to said first terminal switch means.

8. A frequency synthesizer, comprising in combination:
first mixer means,
second mixer means,
first frequency source means,
means connected to said first frequency source means for cycling said first frequency source means through a predetermined range of discrete frequencies,
second frequency source means providing first, second and third frequencies as outputs,
first terminal switch means connected to said second frequency source providing said first or second frequencies as an output,
manually operated switch means for selectively connecting said first or second frequencies from said second frequency source to said first terminal switch means,
second terminal switch means connected to said second frequency source providing said third frequency as an output,
first switch means selectively connecting said first or second terminal switch means and said first frequency source means to said first mixer means throughout the first cycle and a half of said first frequency source means and to said second mixer means throughout the second cycle and a half of said first frequency source means,
means connected to said first switch means for reversing polarity of said first switch means to cause said first or second terminal switch means and said first frequency source means to be connected to said second mixer means throughout the first cycle and a half of said first frequency source means and to said first mixer means throughout the second cycle and a half of said first frequency source means,
second switch means included in said second frequency source means for selectively connecting said first or second frequencies to said first terminal switch means.

9. A frequency synthesizer, comprising in combination:
first mixer means,
second mixer means,
first frequency source means,
means connected to said first frequency source means for cycling said first frequency source means through a predetermined range of discrete frequencies,
second frequency source means providing first, second and third frequencies as outputs,
first terminal switch means connected to said second frequency source providing said first or second frequencies as an output,
manually operated switch means for selectively connecting said first or second frequencies from said second frequency source to said first terminal means,
second terminal switch means connected to said second frequency source providing said third frequency as an output,
first switch means selectively connecting said first or second terminal switch means and said first frequency source means to said first mixer means throughout the first cycle and a half of said first frequency source means and to said second mixer means throughout the second cycle and a half of said first frequency source means,
means connected to said first switch means for reversing polarity of said first switch means to cause said first or second terminal switch means and said first frequency source means to be connected to said second mixer means throughout the first cycle and a half of said first frequency source means and to said first mixer means throughout the second cycle and a half of said first frequency source means,
automatic switch means alternately connecting said first or second terminal switch means to said first switch means after each cycle of said first frequency source means,
second switch means included in said second frequency source means for selectively connecting said first or second frequencies to said first terminal switch means.

References Cited by the Examiner

UNITED STATES PATENTS

| | | | |
|---|---|---|---|
| 3,023,372 | 2/62 | Balish | 331—39 |
| 3,085,202 | 3/63 | Jakubowics | 331—39 |
| 3,155,907 | 11/64 | Wulfsberg et al. | 331—39 X |

ARTHUR GAUSS, *Primary Examiner.*

UNITED STATES PATENT OFFICE
CERTIFICATE OF CORRECTION

Patent No. 3,207,993                               September 21, 1965

Frank R. Previti et al.

It is hereby certified that error appears in the above numbered patent requiring correction and that the said Letters Patent should read as corrected below.

Column 5, line 57, for "provided" read -- providing --; column 7, line 25, for "first" read -- second --; line 37, after "terminal" insert -- switch --; column 8, line 10, after "frequency" insert -- source --.

Signed and sealed this 7th day of June 1966.

(SEAL)
Attest:

ERNEST W. SWIDER                          EDWARD J. BRENNER
Attesting Officer                             Commissioner of Patents